United States Patent
Detar

(10) Patent No.: US 6,400,111 B1
(45) Date of Patent: Jun. 4, 2002

(54) LOCOMOTIVE ELECTRIC WINDSHIELD WIPER SYSTEM UTILIZING DC-DC ELECTRONIC CONVERTOR POWER SOURCE

(75) Inventor: Gail Leroy Detar, Erie, PA (US)

(73) Assignee: General Electric Company, Erie, PA (US)

( * ) Notice: Subject to any disclaimer, the term of this patent is extended or adjusted under 35 U.S.C. 154(b) by 0 days.

(21) Appl. No.: 09/495,256

(22) Filed: Jan. 31, 2000

(51) Int. Cl.[7] .................................................. G05B 5/00
(52) U.S. Cl. ................... 318/445; 318/DIG. 2; 318/282; 318/466; 318/468; 318/444; 15/250.001; 15/250.01
(58) Field of Search ........................... 318/DIG. 2, 444, 318/443, 445, 461, 466, 468, 471, 280, 282, 286; 15/250.001, 250.01, 250.12, 250.14, 256.5

(56) References Cited

U.S. PATENT DOCUMENTS

| | | | | |
|---|---|---|---|---|
| 4,339,839 A | * | 7/1982 | Knights .................... | 15/250.04 |
| 4,585,980 A | * | 4/1986 | Gille et al. ................... | 318/444 |
| 4,665,488 A | * | 5/1987 | Graham et al. ............. | 364/424 |
| 5,157,314 A | * | 10/1992 | Kuhbauch .................... | 318/443 |
| 5,506,483 A | * | 4/1996 | McCann et al. ............. | 318/444 |
| 5,568,026 A | * | 10/1996 | Welch ......................... | 318/443 |

* cited by examiner

Primary Examiner—Robert E. Nappi
Assistant Examiner—Rina I. Duda
(74) Attorney, Agent, or Firm—Carl Rowold, Esquire; General Electric Co.; Terry M. Sanks, Esq.

(57) ABSTRACT

A system and method for using a relatively high voltage power source on a locomotive to power a windshield wiper system that is capable of operating at variable and interval delay speeds comprising a first DC electric motor, a second DC electric motor, a controller operatively connected for enabling operation thereof, and a convertor power supply connected to the relatively high voltage power source where the convertor has a dynamic response characteristic emulating the electric power characteristics of a conventional vehicle battery whereby the convertor can be rated for supplying nominal motor current but can supply relatively high currents to the first DC motor to allow the motor to overcome stalled conditions

5 Claims, 2 Drawing Sheets

LOCOMOTIVE ELECTRIC WINDSHIELD WIPER SYSTEM UTILIZING DC-DC ELECTRONIC CONVERTOR POWER SOURCE

BACKGROUND OF THE INVENTION

This invention relates to locomotive windshield wiper systems, and more specifically to an electrically powered locomotive windshield wiper system incorporating a DC-DC electronic power convertor having a current source characteristic emulating a conventional vehicle battery so as to provide sufficient current to overcome high torque loads caused by snow, ice or other debris on a windshield.

Locomotive windshield wiper systems have historically been powered by pneumatic motors even though pneumatic motored wipers have several undesirable features. For example, pneumatic motored wipers are noisy to operate and the elevated noise can be heard in the locomotive operator's cabin. Further, pneumatic wipers wipe in a sporadic, jerky motion and sometime stall in mid-sweep. Additionally, pneumatic wiper systems require two separate and independent controllers, one for the wipers and a second for a washer system. Still further, pneumatic wipers do not have capability for interval delay speeds. Because of these undesirable features, locomotive owners and builders would like to cease using pneumatic wipers.

A typical diesel-electric locomotive uses a relatively high voltage battery as compared to conventional vehicle systems. For example, a typical locomotive uses a 74 Vdc battery to supply suitable cranking power for a 4400 HP, 16 cylinder diesel engine. Use of this battery to power a windshield wiper system having conventional 12 volt DC motors presents several problems. The typical solution of using a dropping resistor to reduce voltage to the relatively low voltage DC motors is not desirable due to the excessive power consumption in the dropping resistor and the current limiting effect of the resistor when high currents are required to overcome high torque, or stalled, situations such as a snow-loaded windshield or when wiper blades were frozen to the glass. If the motor is unable to draw enough current to develop sufficient torque to clear the load, this system is unsatisfactory.

Conventional DC-to-DC power convertors for converting the 74 Vdc battery voltage to about 12 Vdc for the windshield wiper motor are also unsatisfactory. It is believed that existing power convertors, which could supply the expected steady state current, could not provide the high current required to drive a high torque load. More particularly, such convertors are designed to supply some nominal current at a tightly regulated voltage and are not capable of supplying substantially higher currents without their protective circuits effecting a shut down. While this problem could be overcome by providing a convertor with substantially higher nominal current capacity, the cost of such a high capacity convertor would be excessive. The reason for this is because power supply and convertor designers design power convertor with rigid voltage output characteristics, thus in stalled conditions, existing convertors would continue to maintain a constant voltage instead of allowing for an increase in current output from the convertor.

Towards this end, there is a particular need for a windshield wiper power system that can utilize electric power from a locomotive's relatively high voltage battery, perform satisfactorily when the wipers experience high torque situations, produce less noise in the locomotive operator's cabin, allow the washer system and wiper system to operate from the same controller, provide operation of the wipers at a variety of interval delay speeds and not have a cost which makes the system impractical.

SUMMARY OF THE INVENTION

A windshield wiper/washer system for a locomotive having a relatively high voltage power source comprising a first DC electric motor connected for driving a windshield wiper and a second DC electric motor connected for driving a windshield washer. A DC to DC power convertor having input terminals to receive power from the locomotive power source and being operative to convert relatively high voltage to relatively low voltage suitable for powering the first and second motors. The power convertor also has output terminals connected to supply DC electric power to the first and second DC electric motors. A controller is connected to enable operation of the motors. The converter, when operating, has a dynamic response characteristic that emulates the electric power characteristics of a conventional vehicle battery whereby the power convertor can be rated for supplying nominal motor current but can supply relatively high currents to the first DC motor to allow the motor to overcome stalled conditions.

BRIEF DESCRIPTION OF THE DRAWINGS

For a better understanding of the present invention, reference may be had to the following detailed description taking in conjunction with the accompanying drawings in which.

DETAILED DESCRIPTION OF THE INVENTION

Figure 1:
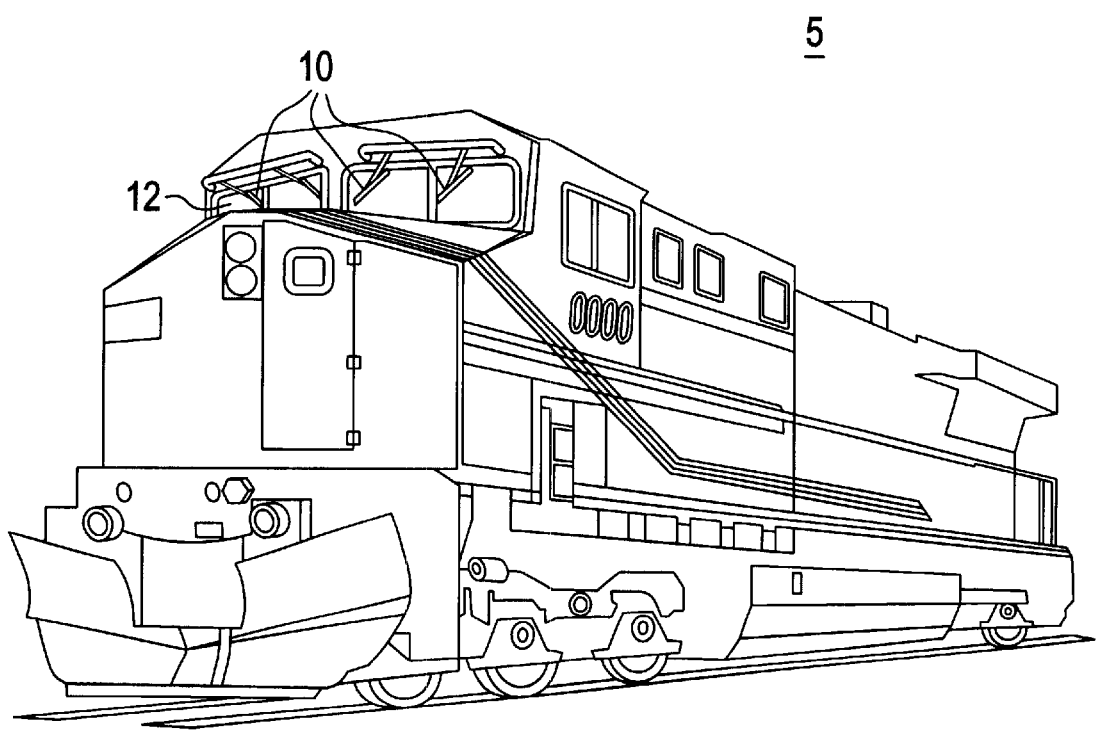
FIG. 1 is an illustration of a locomotive with windshield wipers.

FIG. 1 is a perspective view of an exemplary diesel-electric locomotive which may incorporate the present invention. The locomotive includes a split windshield 6, 8 and a pair of wipers 10 used conventionally to clear the windshields 6, 8 to improve the locomotive operator's vision during inclement weather, such as rain, frost, or snow. As illustrated in the functional block diagram of FIG. 2, the wipers 10 are part of a windshield wiper system 15 which preferably also includes a washer motor 27 and a wash nozzle 29 to apply a cleaning solution to assist in cleaning a dirty windshield 12 during operation of the wipers 10.

Figure 2:
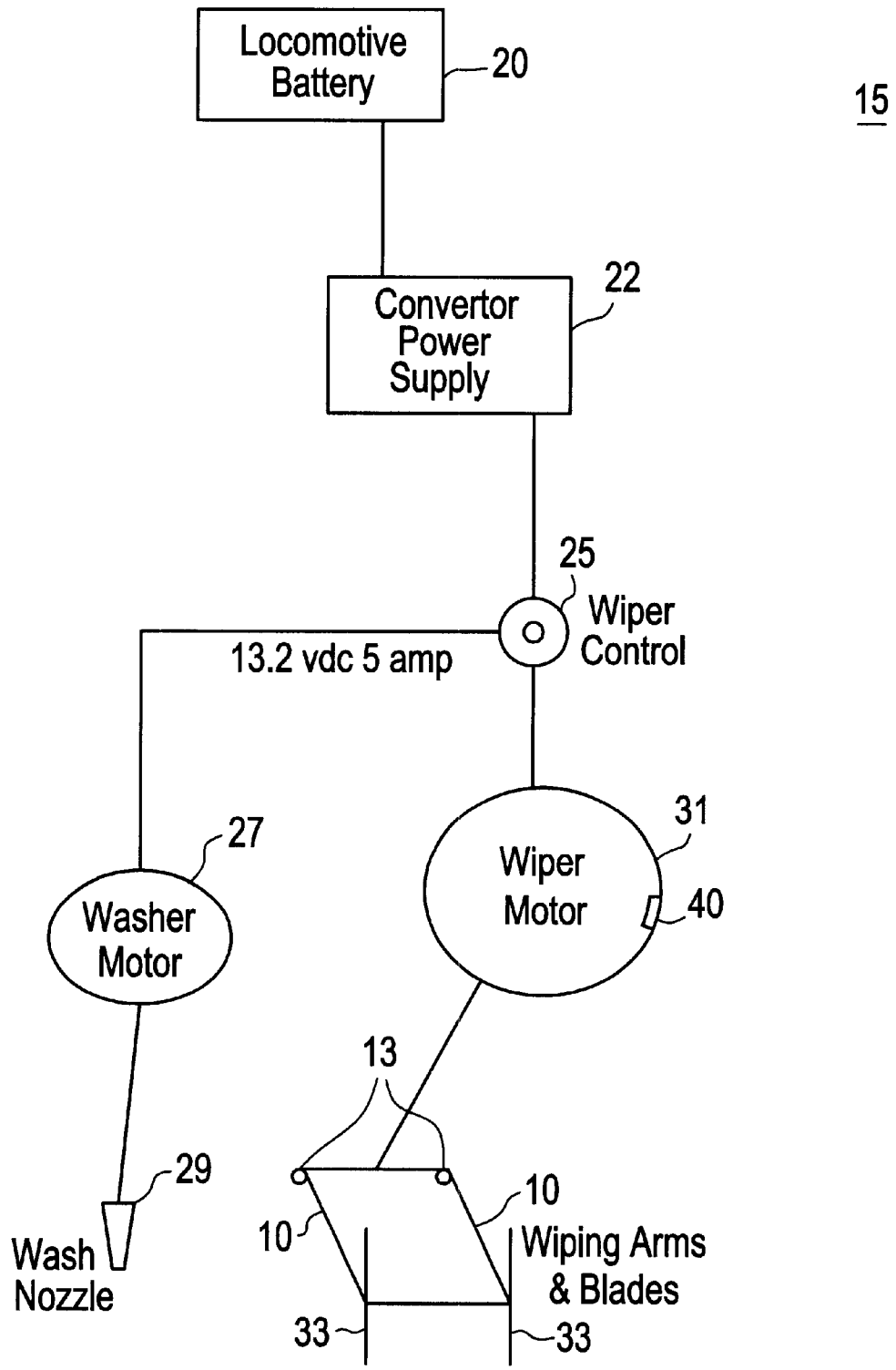
FIG. 2 is a simplified block diagram of an exemplary embodiment of the present invention.

In the illustrative embodiment of FIG. 2, a locomotive battery 20, typically having a relatively high nominal direct current (DC) voltage, such as, for example, 74 Vdc is connected to provide power to a DC-DC electronic convertor or power supply 22 which converts the relatively high voltage to a new relatively low voltage such as, for example, 13 Vdc. In one embodiment, the convertor 22 provides 13 amps continuous at 12.6 to 13.8 Vdc for normal running conditions, with a 5 second capability to provide 25 amps at 12 Vdc minimum for high torque operations such as when snow, ice or other debris inhibits movement of wipers 6, 8. This high current capability emulates the power characteristic available from a conventional low voltage vehicle battery such as a typical 12 volt lead-acid battery. The ability to emulate such a battery is particularly important in order to make the conversion to an electrically powered windshield wiper system practical in a locomotive environment. In other words, it is desirable to utilize existing windshield wiper drives for locomotives in order to keep costs under control. However, existing wiper systems are used on trucks and buses which have 12 volt power systems and the wiper drive motors are designed for operation on 12 volts DC. Application of higher voltage, such as the locomotives 74 Vdc, would overload and burn-out the wiper drive motors. The drive motors can withstand above normal current for short periods and are generally provided with thermal cutouts which open circuit the motors if power exceeds a predetermined maximum value. For example, a typical wiper drive motor operating at a nominal 13 amperes may be able to handle 25 amperes for a short time period, for example, 5 seconds. A conventional vehicle battery can easily supply a nominal 13 volts DC at 25 amps with very little voltage droop. On the other hand, regulated power supplies are routinely designed to have tight regulation. A power supply designed for 13 Vdc at a rating of 13 amps has a certain physical size and cost and is not designed to produce twice the current rating even for short time intervals. Of course, power supplies are available that are rated at 13 Vdc and 25 amps but those supplies have a larger physical size and higher cost that make them uneconomical in a windshield wiper application. Thus, it is important to have a supply that is small, low cost but can provide short term high currents.

The relatively low voltage from convertor 22 is supplied to a wiper control unit 25 which controls the supply of power to a washer DC electric motor 27 and to wiper drive motor 31. Washer motor 27 is coupled in driving relationship to a washing solution from a reservoir (not shown) which pumps the solution from a reservoir (not shown) and through a wash nozzle 29 for applying the washing solution to the windshields 6, 8. In one exemplary embodiment, the washer motor 27 is capable of providing liquid through the wash nozzle 29 at a rate of 70 cubic inches per minute.

The wiper control 25 also controls power supplied from the convertor 22 to the wiper DC electric motor 31. Both the motor 27 and the motor 31 are preferably DC electric wiper motors used in conventional vehicle windshield wiper/washer systems. The control 25 is also a conventional washer/wiper controller which activates and operates the wiper arms 10 and washer motor 27. In one exemplary embodiment, the wiper control unit 25 is capable of operating the wiper motor 31 at a variety of speeds, such as a low speed, high speed, and a variety of interval delay speeds. The wiper motor 31 is capable of handling high torque, such as up to 250 pounds-inch of torque, that may be applied to a wiping blade assembly 33 due to stuck wiper blades 35 caused by obstructions, such as snow loads, ice or other debris. The wiper blade assembly 33 includes the wiping arms 10, blades 35, and a drive gear box assembly 37. When high torque situations are experienced and the wiper motor 31 is unable to turn, the convertor 22 will supply a higher current, such as 25 amps to the wiper motor 31 for a limited time period, such as 5 seconds, to allow the wiper assembly 33 to overcome the high torque obstruction. The wiper motor 31 includes a thermal cutoff over-current sensor 40 which will heat up and effect an open-circuit condition before the wiper motor 31 is damaged by the additional applied current.

The convertor 22 is designed to provide a nominal 13 volts DC at rated current, e.g., 15 amperes. In a motor high-torque load condition, the convertor 22 is designed to provide current up to a level of about 25 amps. However, for cost and size acceptability, the convertor 22 is designed to allow its voltage to droop to 12 volts or less at the higher current. This action emulates the function of a conventional battery, i.e., output voltage droop at higher current, in order to provide the current needed to overcome short-term, high torque loads. Thus, the convertor 22 differs from conventional tightly regulated power supplies and provides a cost effective way to integrate electric washer/wipers into a locomotive system.

While the invention has been described in what is presently considered to be the preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A windshield wiper/washer system for a locomotive having a relatively high voltage power source, the system comprising:

a first relatively low voltage DC electric motor connected in driving relationship to a windshield wiper system;

a second relatively low voltage DC electric motor connected in driving relationship to a windshield washer system;

a DC to DC power convertor connected to receive power from the relatively high voltage locomotive power source and being operative to convert the relatively high voltage to a relatively low voltage suitable for powering said first and second DC electric motors, said power convertor being connected to supply DC electric power to said first and second DC electric motors;

a controller operatively connected with said convertor for enabling controlled delivery of power to each of said first and second DC electric motors; and said power convertor when operating having a dynamic response characteristic emulating the electric power characteristics of a conventional vehicle battery whereby the power convertor can supply relatively high currents with a drooping output voltage to said first DC electric motor to allow said first DC motor to overcome high torque load conditions.

2. The system of claim 1 wherein said first DC motor contains an overcurrent thermal sensor to interrupt power supplied to said first DC motor before said relatively high current supplied by said power convertor damages said first DC motor.

3. The system of claim 1 wherein said controller operates said first DC motor at a variety of speeds including interval delay speeds.

4. A method for operating a locomotive windshield wiper/washer system said locomotive having a relatively high voltage power source, the method comprising:

driving a windshield wiper system with a first relatively low voltage DC electric motor;

driving a windshield washer system with a second relatively low voltage DC electric motor;

converting said relatively high voltage from said locomotive to a relatively low voltage which is acceptable for powering each of said first and second DC electric motors;

controlling delivery of power to each of said first and second DC electric motors;

operating each of said first and second DC electric motors at said relatively low voltage and at a constant relatively low current during normal operating conditions;

supplying relatively high currents with a drooping output voltage to said first DC electric motor by emulating the electric power characteristics of a conventional vehicle battery to overcome high torque load conditions.

5. The method of claim 4 wherein said operating step further includes operating said first motor at variable and interval delay speeds.

* * * * *